United States Patent [19]
Konishi

[11] Patent Number: 5,136,589
[45] Date of Patent: Aug. 4, 1992

[54] APPARATUS FOR USING DUPLEX TRANSMISSION LINE IN NETWORK

[75] Inventor: Kuniyoshi Konishi, Hachiooji, Japan

[73] Assignee: Kabushiki Kaisha Toshiba, Kawasaki, Japan

[21] Appl. No.: 429,543

[22] Filed: Oct. 31, 1989

[30] Foreign Application Priority Data

Oct. 31, 1988 [JP] Japan .................................. 63-275601

[51] Int. Cl.⁵ ........................................... G06F 11/20
[52] U.S. Cl. .................................. 371/11.2; 370/16.1; 371/20.6
[58] Field of Search ..................... 371/11.2, 20.6; 370/16.1

[56] References Cited

U.S. PATENT DOCUMENTS

| | | | |
|---|---|---|---|
| 4,354,267 | 10/1982 | Mori et al. | 371/11.2 |
| 4,527,270 | 7/1985 | Sweeton | 371/11.2 |
| 4,538,264 | 8/1985 | Bahr et al. | 371/11.2 |
| 4,542,496 | 9/1985 | Takeyama et al. | 370/16.1 |
| 4,710,915 | 12/1987 | Kitahara | 370/16.1 |
| 4,723,241 | 2/1988 | Grobel et al. | 371/11.2 |
| 4,737,957 | 4/1988 | Nohmi et al. | 371/11.2 |
| 4,951,280 | 8/1990 | McCool et al. | 370/16.1 |

*Primary Examiner*—Charles E. Atkinson
*Attorney, Agent, or Firm*—Oblon, Spivak, McClelland, Maier & Neustadt

[57] ABSTRACT

In a network system, a duplex transmission line has two transmission lines. Each transmission line, which is connected to a transmitting section, a receiving section and a serial/parallel converter, enables data transmission to be performed in a normal operating condition. When a fault is generated in the transmission lines, the fault position is separated by a line changing section and a folded loop is formed, whereby the network system is reconstructed.

5 Claims, 8 Drawing Sheets

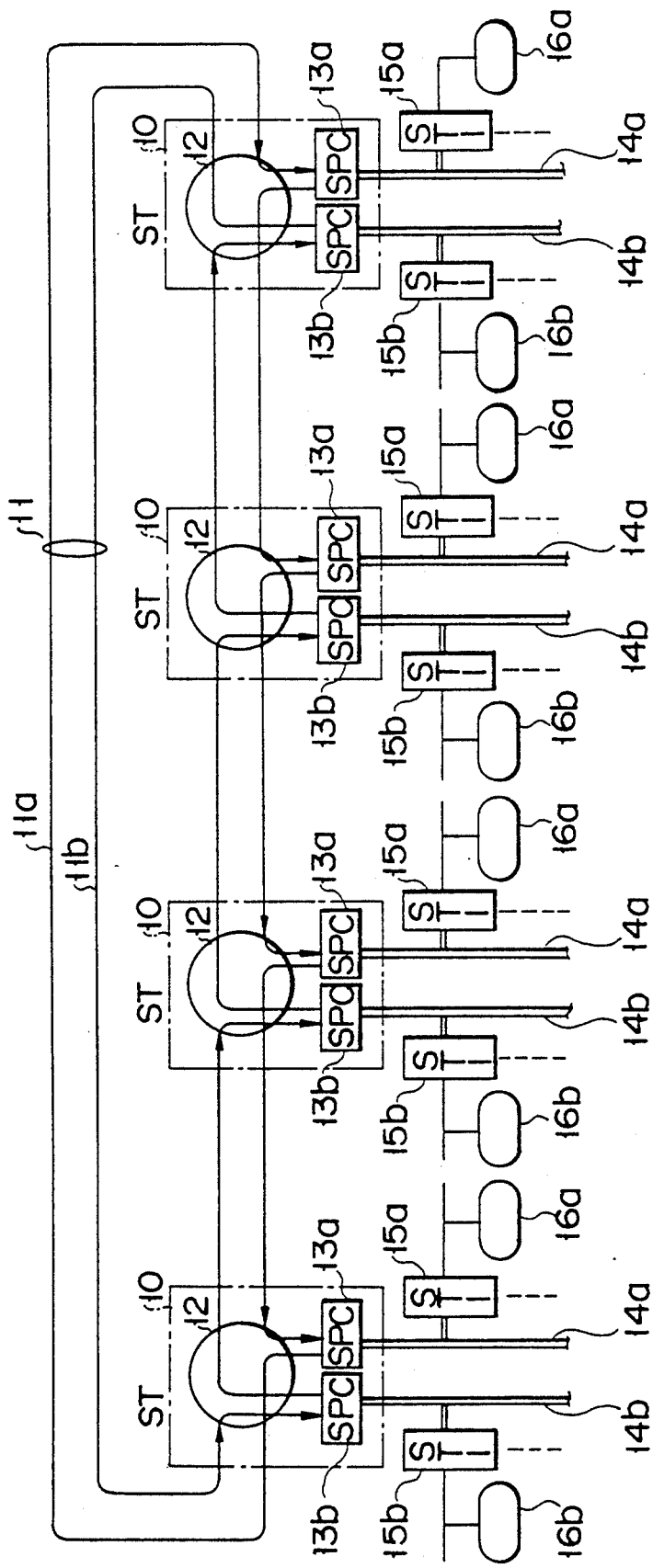
F I G. 2A

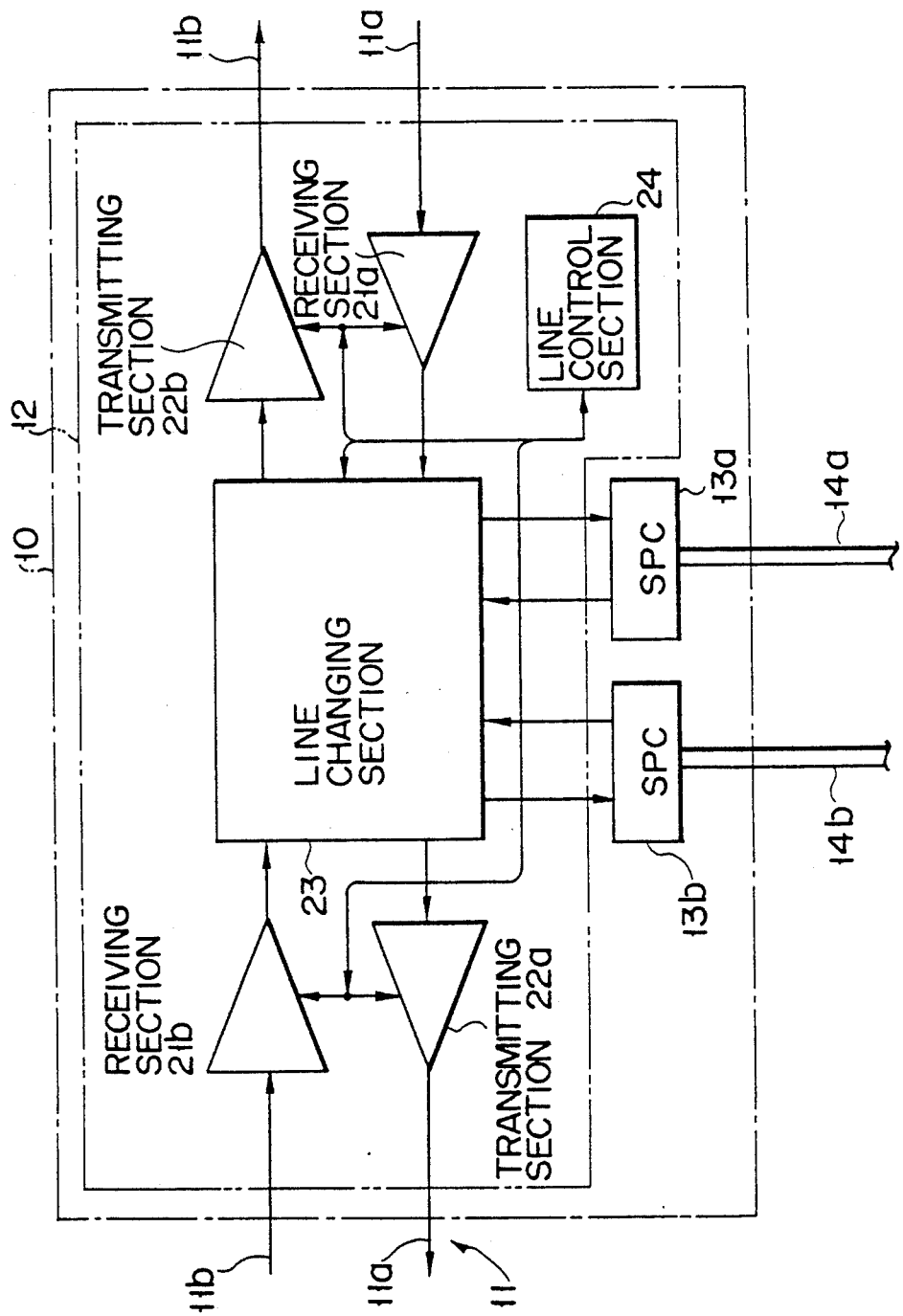
F I G. 3

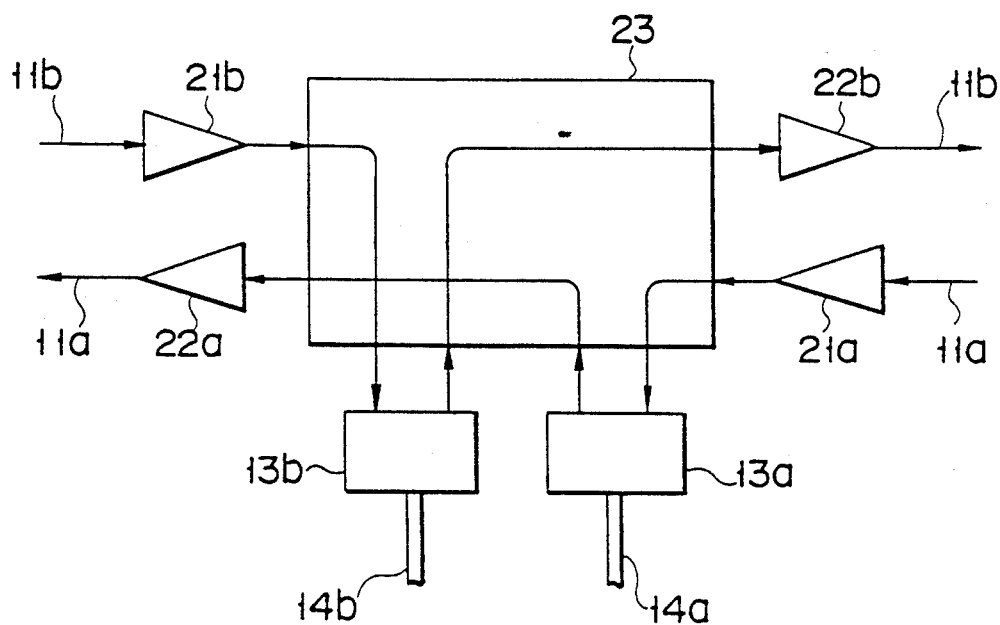
F I G. 5A
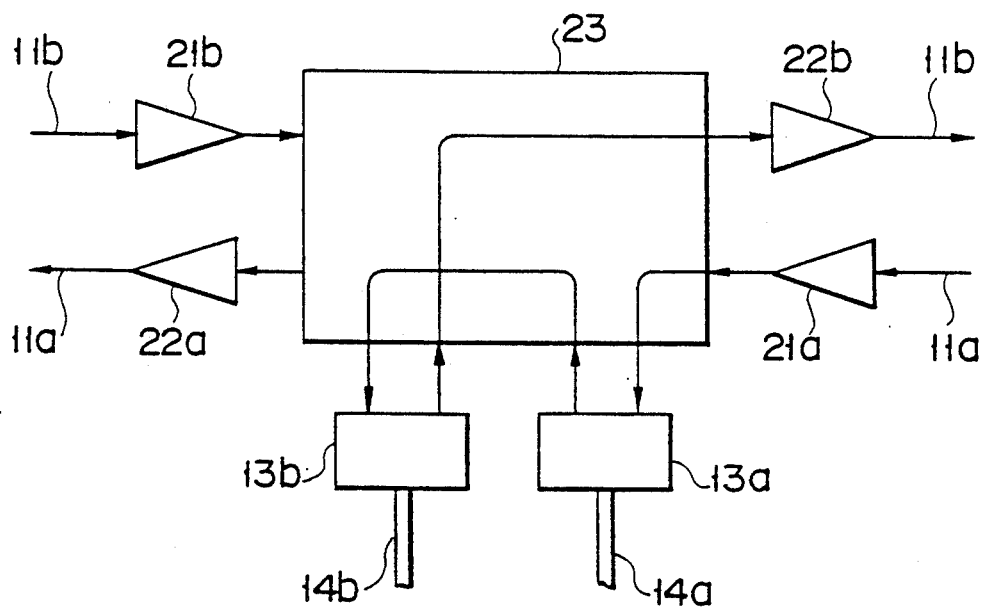
F I G. 5B

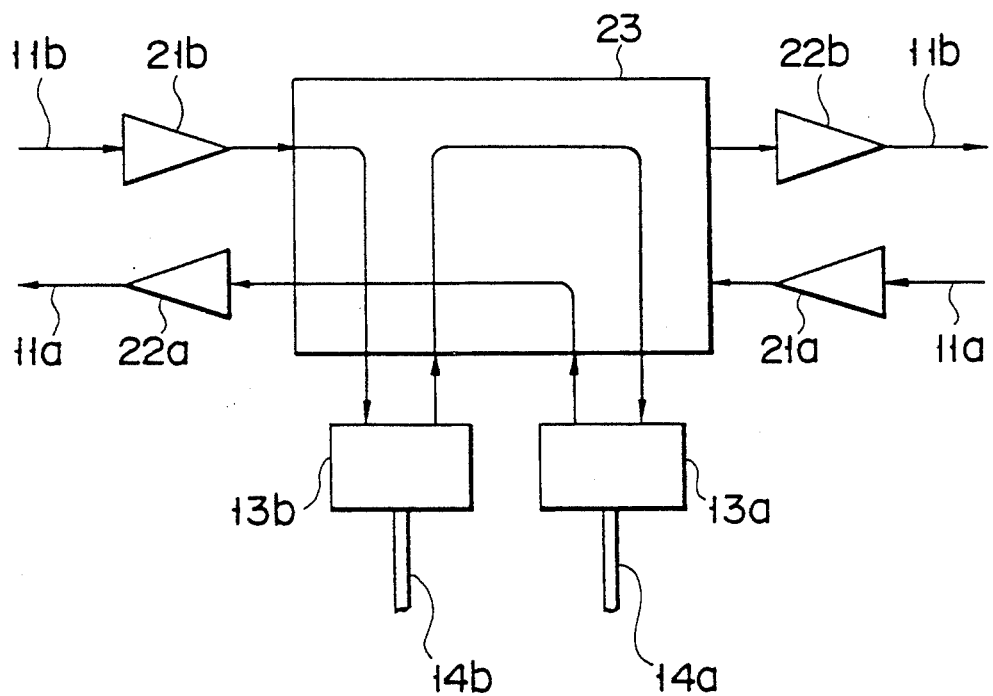
F I G. 5C

5,136,589

APPARATUS FOR USING DUPLEX TRANSMISSION LINE IN NETWORK

BACKGROUND OF THE INVENTION

1. Field of the Invention

The present invention relates to an apparatus for using a duplex transmission line in a network.

2. Description of the Related Art

In general, a ring-type local area network comprises, as shown in FIG. 1A, a plurality of node stations (STs) 30, and a duplex transmission line 31 for connecting the STs 30 in a ring shape. Each ST 30 comprises a transmission line interface section 32, which includes a receiving section, a transmitting section, a line changing section and a line control section (these not shown), and a serial-parallel converter (SPC) 33 for performing serial/parallel conversion of data transmitted from/to the line changing section of the transmission line interface section 32. A device 36 such as a computer or a terminal is connected to the SPC 33 through an internal bus 34 and an ST interface (STI) 35.

The duplex transmission line 31 comprises an operating transmission line 31a and an auxiliary transmission line 31b. In a normal operation state, the operating transmission line 31a is used for data transmission between the devices 36, and the auxiliary transmission line 31b stays in a waiting state. As shown in FIG. 1B, when a fault such as line break occurs at point A in the duplex transmission line 31 and the normal operation of the network is not maintained, two STs 30 adjacent to the fault position A form U-links (folded loops). Thus, the fault position A is separated from the network, and a data transmission network is reconstructed using the operating transmission line 31a and the auxiliary transmission line 31b.

In the conventional ring-type local area network, the auxiliary transmission line 31b of the duplex transmission line 31 is normally set in the waiting state, and is not used for data transmission. Thus, the entire network is not fully utilized for data transmission.

As seen from the above, there is an increased demand for an apparatus wherein a data transmission efficiency of a duplex transmission line in a ring-type local area network is fully utilized in a normal operating state, and, in case of a fault, the network can be reconstructed, like a conventional apparatus.

SUMMARY OF THE INVENTION

It is an object of the present invention to provide an apparatus for using a duplex transmission line in a network.

According to the present invention, there is provided a network system comprising:
a duplex transmission line having first and second transmission lines;
a plurality of node stations connected to the first and second transmission lines in a ring;
wherein each node station includes:
first receiving means for receiving first data from the first transmission line;
first transmitting means for transmitting second data to the first transmission line;
first converting means for serial/parallel-converting third data and parallel/serial-converting fourth data;
second receiving means for receiving fifth data from the second transmission line;
second transmitting means for transmitting sixth data to the second transmission line;
second converting means for serial/parallel-converting seventh data and parallel/serial-converting eighth data;
first constructing means for constructing a first data line by connecting through the first receiving means, the first converting means, and the first transmitting means, and constructing a second data line by connecting through the second receiving means, the second converting means, and the second transmitting means, when the first and second transmission lines are in a normal transmission condition; and
second constructing means for constructing one of a third data line and a fourth data line, when the first and second transmission lines are in a fault transmission condition, the third data line constructed by connecting through the first receiving means, the first converting means, the second converting means and the second transmitting means, the fourth data line constructed by connecting through the second receiving means, the second converting means, the first converting means and the first transmitting means.

BRIEF DESCRIPTION OF THE DRAWINGS

FIGS. 2A and 2B show a network system according to an embodiment of the present invention;
FIG. 3 is a block diagram of a node station;
FIGS. 5A to 5C show line structures changed by a line changing section in accordance with a transmission line condition.

DETAILED DESCRIPTION OF THE PREFERRED EMBODIMENT

An embodiment of the present invention will now be described with reference to the accompanying drawings.

Figure 1A:
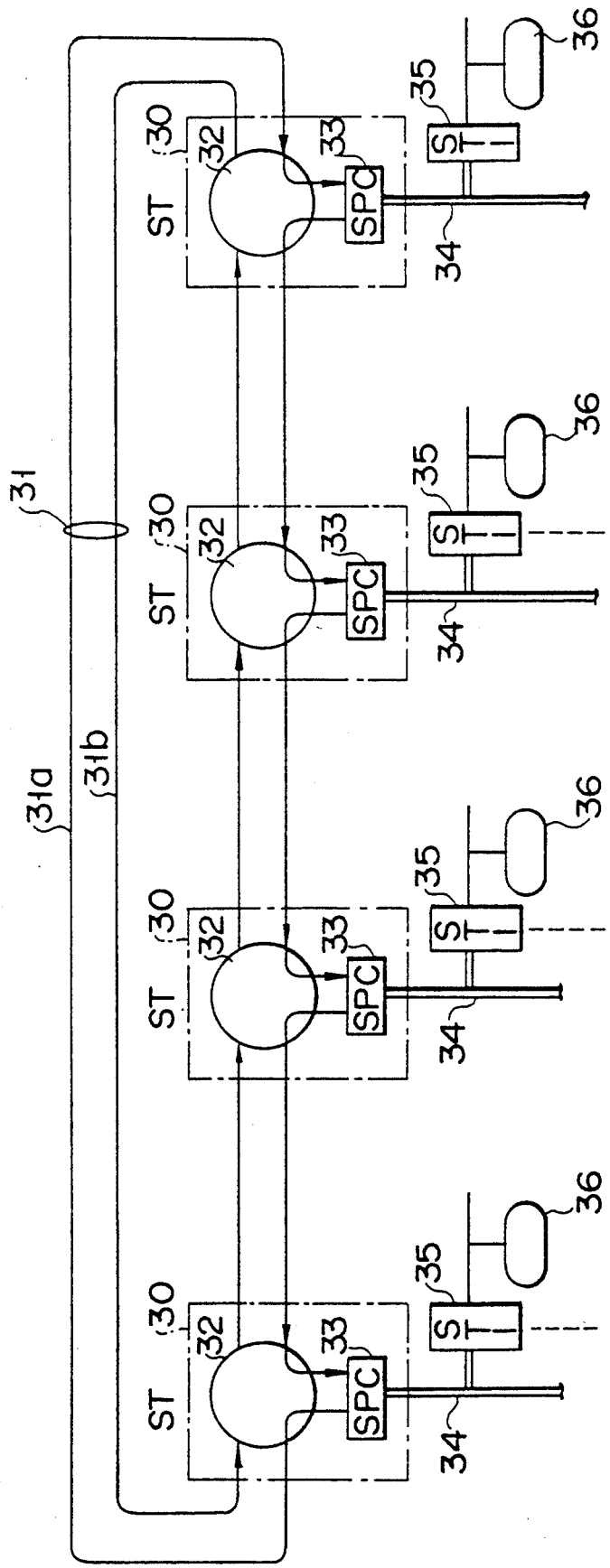
FIGS. 1A and 1B show a conventional network system.
Figure 1B:
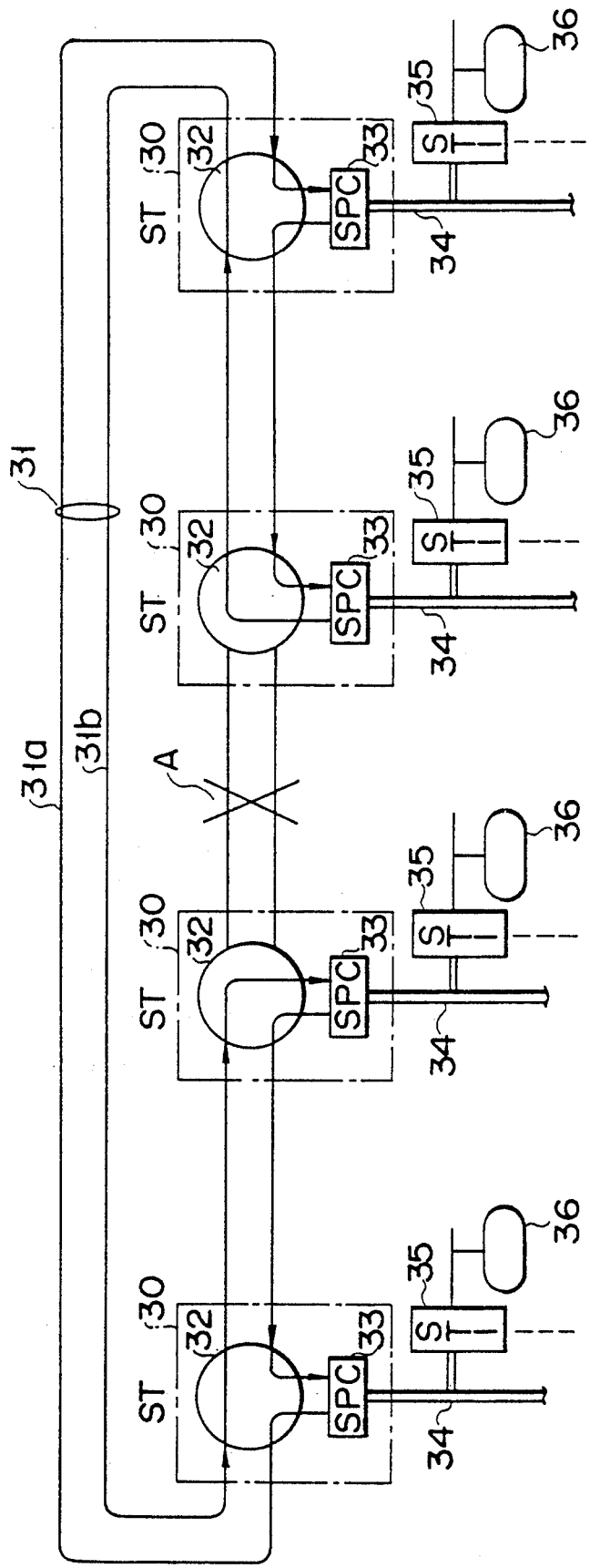
Figure 2B:
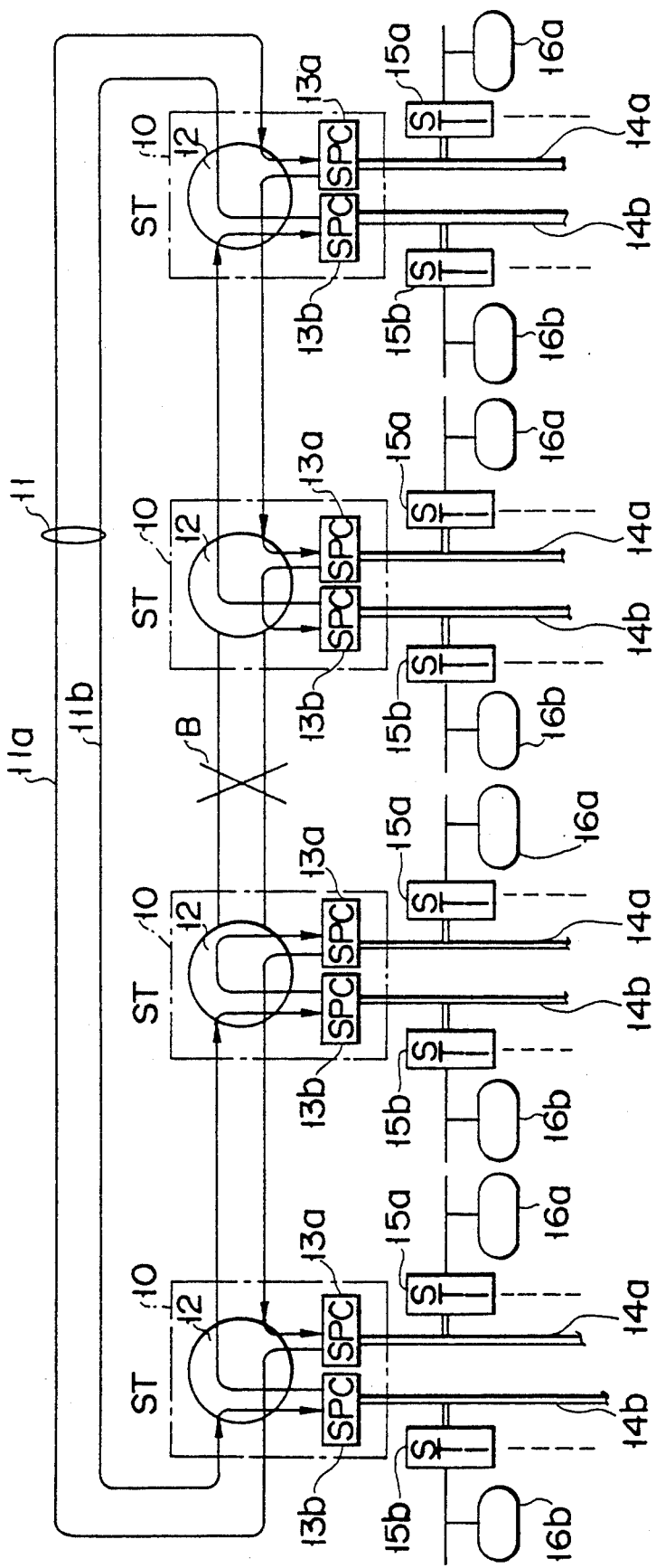

In a network system shown in FIGS. 2A and 2B, a plurality of node stations (STs) 10 are connected in a ring by a duplex transmission line 11 constituted by metal cables or optical fiber cables. Since the duplex transmission line 11 comprises two operating transmission lines 11a and 11b, the mode of use of this transmission line 11 differs from that of use of the conventional transmission line 31. The hardware of the transmission line 11 is the same as that of the conventional transmission line 31.

In FIG. 3, the ST 10 comprises receiving sections 21a and 21b, transmitting sections 22a and 22b, a line changing section 23, a line control section 24, and serial-parallel converters (SPC) 13a and 13b. A transmission line interface section 12 includes the receiving sections 21a and 21b, transmitting sections 22a and 22b, line changing section 23 and line control section 24.

The receiving sections 21a and 21b perform waveshaping, timing reproduction and discrimination for signals received from the transmission lines 11a and 11b.

The transmitting sections 22a and 22b transmit signals suitable for the corresponding transmission medium to the transmission lines 11a and 11b.

The SPCs 13a and 13b perform serial-parallel conversion to the transmission data in the receiving sections 21a and 21b and the transmitting sections 22a and 22b.

The line changing section 23 changes the lines connected to the SPCs 13a and 13b.

The line control section 24 monitors the states of the receiving sections 21a and 21b and the transmitting sections 22a and 22b, and detects trouble locations in the network including the transmission lines 11a and 11b. Based on the detection result, the line changing section 23 is controlled.

The devices 16a and 16b are connected to the SPCs 13a and 13b through the ST interfaces 15a and 15b and the internal buses 14a and 14b.

An operation of the above-described network system will now be described.

As shown in FIG. 2A, in the network system which is operated in the normal state, the transmission lines 11a and 11b of the duplex transmission line 11 are independently used. More specifically, the transmission line 11a is connected to the serial-parallel converter 13a by the line changing section 23 in the transmission line interface 12 of each ST 10 through the receiving and transmitting sections 21a and 22a. Thus, data transmission between the devices 16a is carried out through the transmission line 11a.

On the other hand, the transmission line 11b is connected to the serial-parallel converter 13b by the line changing section 23 of the transmission line interface section 12 of each ST 10 through the receiving and transmitting sections 21b and 22b. Thus, data transmission between the devices 16b is carried out through the transmission line 11b.

As has been described above, by the operation of the line changing section 23, the transmission signal between the receiving section 21a and the transmitting section 22a is supplied to the serial-parallel converter 13a, and the transmission signal between the receiving section 21b and the transmitting section 22b is supplied to the serial-parallel converter 13b. Thus, a network using the transmission line 11a as a transmission medium, and a network using the transmission line 11b as a transmission medium can be constructed. From the viewpoint of the total network system, the transmission efficiency is doubled in comparison with the conventional network system.

In the case of the network system shown in FIG. 2A, data transmission between the devices 16a and 16b cannot be performed. For example, if a bus connection module is provided for connecting the internal buses 14a and 14b in the ST 10, the data transmission between the devices 16a and 16b can be carried out.

When a trouble such as line break occurs in point B of the duplex transmission line 11, as shown in FIG. 2B, and it becomes impossible to maintain the current operating state of the network system. Instead, U-links (folded loops) are formed by two STs 10 adjacent to the point B. As a result, the troubled point B is separated from the network system. By connecting the transmission lines 11a and 11b which constitute the duplex transmission line 11, the network system is reconstructed. From the viewpoint of the total network system, the transmission efficiency is substantially set to the same level as the conventional system.

Figure 4:
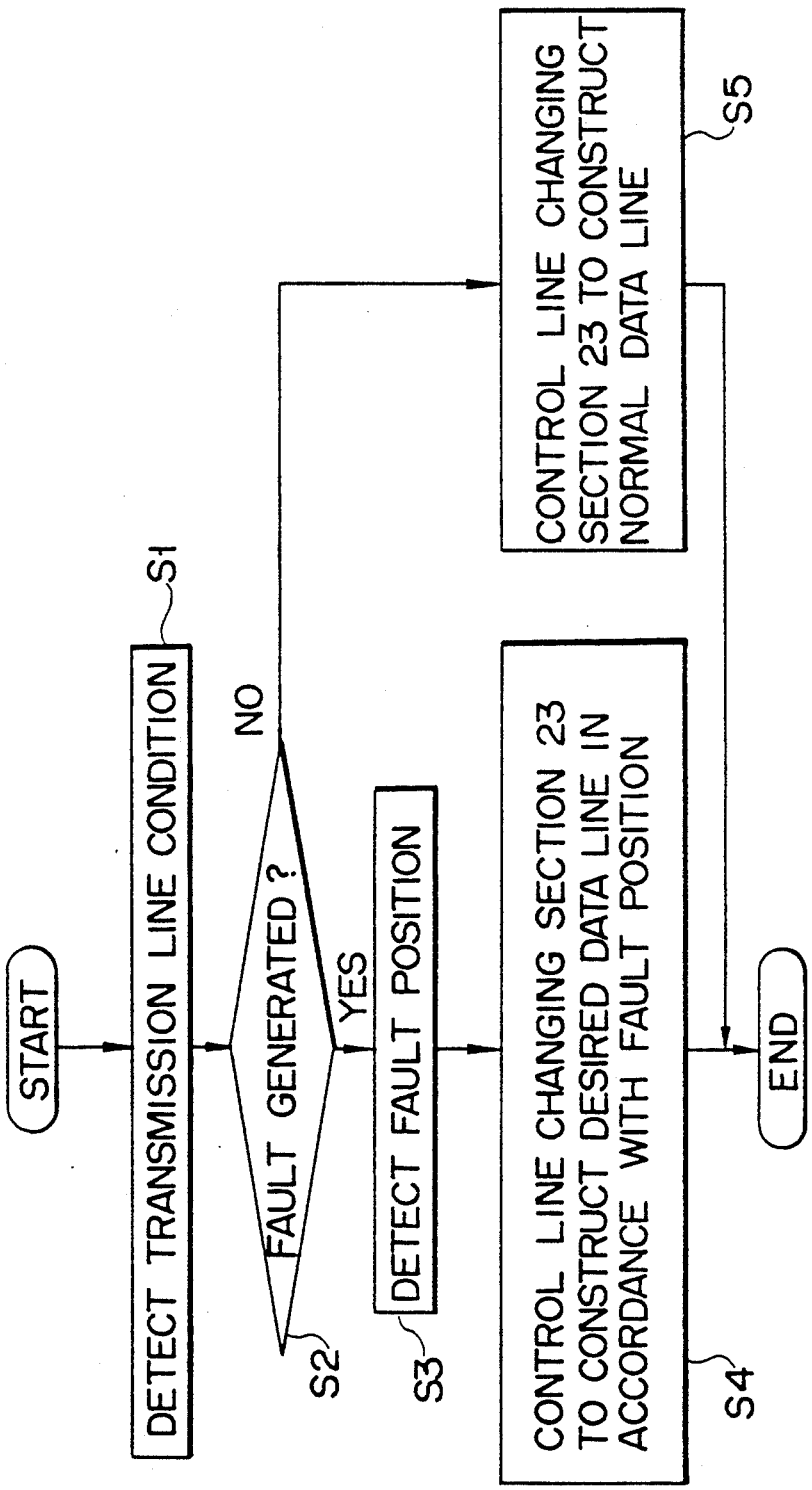
FIG. 4 is an operation flowchart of a line control section.

The reconstruction of the above-described network system will now be described with reference to an operation flowchart (FIG. 4) of the line control section 24.

In step S1, the condition of the transmission line is detected.

When it is determined in step S2 that no fault is generated in the duplex transmission line 11, the line changing section 23 is controlled to construct a normal data line (see FIG. 5A) in step S5.

When it is determined in step S2 that a fault generates in the duplex transmission line 11, the fault position B is detected by the line control sections 24 of the two STs 30 adjacent to the fault position B (step S3).

In step S4, the line changing section 23 is controlled to construct a desired data line in accordance with the fault position. In other words, in FIG. 2B, in the line changing section 23 of the ST 10 located on the right side of the fault position B, the transmission line 11a is connected to the serial input of the serial-parallel converter 13a through the receiving section 21a. The serial output of the serial-parallel converter 13a is connected to the serial input of the serial-parallel converter 13b, and the serial output of the serial-parallel converter 13b is connected to the transmission line 11b through the transmitting section 22b (see FIG. 5B). Thus, the transmission line 11a is connected to the transmission line 11b, and a U-link is formed on the right side of the fault position B.

On the other hand, in the line changing section 23 of the ST 10 located on the left side of the fault position B, the transmission line 11b is connected to the serial input of the serial-parallel converter 13b through the receiving section 21b. The serial output of the serial-parallel converter 13b is connected to the serial input of the serial-parallel converter 13a, and the serial output of the serial-parallel converter 13a is connected to the transmission line 11a through the transmitting section 22a (see FIG. 5C). Thus, the transmission line 11b is connected to the transmission line 11a, and a U-link is formed on the left side of the fault position B.

As has been described above, in the normal operating state, the duplex transmission line of the ring-type local area network can be used as two independent transmission lines, and the data transmission can be performed independently by using the transmitting section, receiving section and serial-parallel converter provided to each transmission line. Therefore, the transmission efficiency in the normal operating state can be doubled in comparison with the conventional network. Furthermore, when a fault is generated in the transmission lines, the fault position is separated from the network, and the network is reconstructed.

The present invention is not limited to the above embodiment, and various modifications may be made to this invention within the scope of the subject matter of invention.

What is claimed is:

1. A network system comprising:
    a first transmission line;
    a second transmission line;
    a plurality of node stations connected to the first and second transmission lines in a ring;
    a plurality of first devices for exchanging data with each other through the first transmission line; and
    a plurality of second devices for exchanging data with each other through the second transmission line;
    wherein each of the node stations includes;
    first receiving means for receiving first data from the first transmission line;

first transmitting means for transmitting second data to the first transmission line;

first converting means connected to one of the first devices for serial/parallel-converting third data and parallel/serial-converting fourth data;

second receiving means for receiving fifth data from the second transmission line;

second transmitting means for transmitting sixth data to the second transmission line;

second converting means connected to one of the second devices for serial/parallel-converting seventh data and parallel/serial-converting eighth data; and constructing means for constructing a first data line in a normal transmission condition, the first data line having a connection between the first receiving means and the first converting means, a connection between the first converting means and the first transmitting means, a connection between the second receiving means and the second converting means, and a connection between the second converting means and the second transmitting means, and constructing one of the first data line, a second data line and a third data line in accordance with a fault point in a fault transmission condition, the second data line having a connection between the first receiving means and the first converting means, a connection between the first converting means and the second converting means, and a connection between the second converting means and the second transmitting means, the third data line having a connection between the second receiving means and the second converting means, a connection between the second converting means and the first converting means, and a connection between the first converting means and the first transmitting means.

2. The system according to claim 1, wherein each of the node stations further comprises means for determining whether the first and second transmission lines are in the normal transmission condition or in the fault transmission condition, detecting the fault point when the first and second transmission lines are in the fault transmission condition, and controlling the constructing means to construct one of the first, second, and third data lines in accordance with a determination result.

3. The system according to claim 1, wherein the first and second transmission lines are used independently as a data transmission line in the normal transmission condition.

4. The system according to claim 1, wherein the first and second transmission lines are connected to each other by the second constructing means in the fault transmission condition.

5. A network system comprising:

a first transmissiion line;

a second transmission line;

a plurality of node stations connected to the first and second transmission lines in a ring;

a plurality of first devices connected to the first transmission line for exchanging data with each other; and wherein each of the node stations includes:

constructing means for constructing a first data line in a normal transmission condition, the first data line having a connection between the first transmission line and the first device, a connection between the first device and the first transmission line, a connection between the second transmission line and the second device, and a connection between the second device and the second transmission line, and constructing one of the first data line, a second data line and a third data line in accordance with a fault point in a fault transmission condition, the second data line having a connection between the first transmission and the first device, a connection between the first device and the second device, and a connection between the second device and the second transmission line, the third data line having a connection between the second transmission line and the second device means, a connection between the second device and the first device, and a connection between the first device and the first transmission line.

* * * * *